United States Patent Office 3,250,687
Patented May 10, 1966

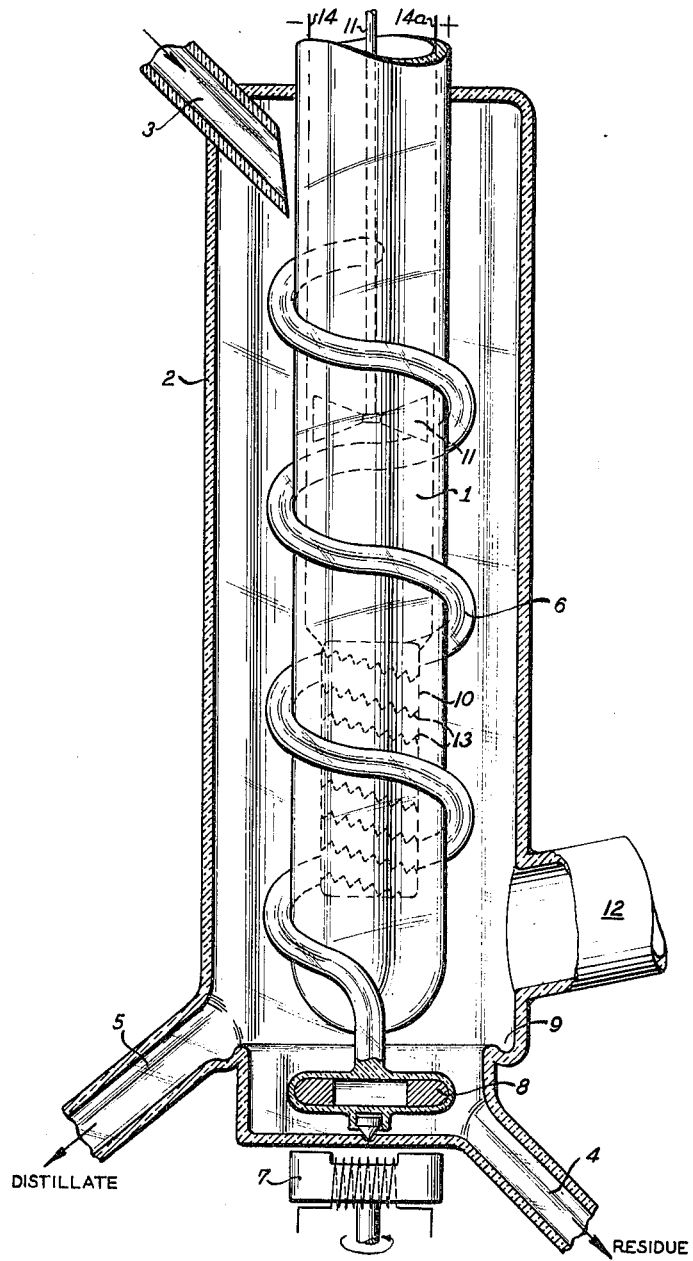

3,250,687
APPARATUS WITH GROUND GLASS SURFACE FOR FILM-TYPE DISTILLATION
Wilhelm Frank, Mainz, Germany, assignor to Jenaer Glaswerk Schott & Gen., Mainz, Germany, a corporation of Germany
Filed Feb. 6, 1962, Ser. No. 171,442
Claims priority, application Germany, Feb. 8, 1961, J 19,399
4 Claims. (Cl. 202—205)

This invention relates to distillation apparatus. More particularly, the invention relates to apparatus for film-type distillation in which the liquid to be treated flows upon an evaporating surface in a relatively thin film and is subjected to distillation in the spread-out condition, the distillate and distillate residue being separately collected. The distillation apparatus of the type of the present invention is most advantageously employed in connection with molecular distillation.

It has been known for some time to apply molecular distillation procedures when it is required to effect the distillation of thermally-sensitive materials of high-molecular weight. In order to keep the distillation temperature as low as possible, the evaporation is accomplished utilizing high vacuum. High vacuum distillation apparatus provided with vaporizing and condensing surfaces separated by substantially short distances is well known. As the liquid to be evaporated may only be heated to as low a temperature as will produce vaporization and that only for a short time, the known devices are generally constructed so that the liquid to be evaporated passes downwardly over the evaporating surface in as thin a layer as possible and as rapidly as possible.

A very well-known form of construction of this type of apparatus for evaporating liquids containing substances which would be impaired if the liquid were subjected to a high temperature for a considerable period of time proposes that the liquid be distributed on a cylindrical vaporizing surface in the form of a thin film, the distribution taking place by gravitational flow. In order to ensure a uniform feed over the entire circumferential surface of a cylinder, the same not being possible solely by gravitational flow, means for uniformly distributing the liquid are provided. The several forms of the means suggested heretofore do indeed produce on the upper portion of the vaporizing surface uniformly thin film; however, after a short flow path, the uniform film separates out into individual descending films of relatively great thickness, separated by areas where liquid film is totally absent. Since distillation takes place from the surface of the film only, such thick films as are provided give poor distillation and considerable thermal decomposition.

A distinct advance in the art came about in accordance with the proposal of K. C. D. Hickmann for distributing the liquid to be distilled on a vaporizing surface by centrifugal force. In accordance with this proposal, the liquid to be distilled is fed into the center of the funnel-shaped device, the surface of which is heated. The funnel-shaped device is rotated rapidly and thereby the liquid to be evaporated flung outwardly. The liquid thus projected moves very rapidly and in the form of a thin layer over the vaporizing surface. This particular technique is suitable for industrial adaptation of film distillation. However, the technique has serious limitations from practical engineering and economic viewpoints, and, in particular, the difficulties of adaptation of these rapidly rotating systems to high vacuum operation; sealing not being a simple problem. The maintenance of a high vacuum is therefore extremely difficult and may only be accomplished utilizing large pumps. Furthermore, adaptation to the construction of smaller laboratory-type apparatus is difficult as, with a small funnel-shaped device, sufficient centrifugal force is not generated to produce a satisfactory projection of the liquid onto the vaporization surface.

On account of the above disadvantages, further improvement of the gravitational flow-type of evaporator has been proposed. Thin film evaporators of the gravitational flow-type have been advanced wherein, in order to obtain a more uniform distribution of the liquid to be treated, means of spreading the liquid upon the evaporating surface, as, for example, slowly rotating flexible wiping devices, were suggested. These devices, however, have a disadvantage in that they may not be constructed as all-glass designs.

It is an object of the present invention to provide an apparatus for a film-type distillation which will not be possessed of the above-mentioned defects, still having a stationary vaporizing surface which is simple and economical to construct and which enables distribution of the liquid thereon in a film substantially thinner than that obtained by gravitational flow.

Another object of this invention is to provide a vacuum unobstructed path distillation apparatus in which the surface of the distilling film is rapidly renewed.

A further object of this invention is to provide film distillation apparatus which will be possessed of novel means of spreading liquid upon the evaporating surface without interfering with the liquid flow path.

These and other more detailed objects will appear in the description and the discussion to follow.

The above and other objects are accomplished by the invention, which includes a thin film evaporator provided with a stationary vaporizing surface therewithin, and means for mechanically distributing and rapidly renewing the film of liquid to be treated on the heated vaporizing surface, which means comprise a rotatable spiral positioned between the wall of the film evaporator and the vaporizing surface and mounted for rotational travel in the space between the two surfaces so that, during rotation of the spiral, the same passes over the vaporizing surface mechanically distributing the liquid in a thin, rapidly renewed film.

In operating the thin-film evaporator of the present invention, the vacuum is applied to the evaporator and the heating means turned on; heating and evacuation are continued until the desired temperature is reached on the evaporating surface. The liquid to be treated is delivered so that it flows down the evaporating surface in a random manner. As the liquid flows down the evaporating surface, it is picked up by the rotating spiral and uniformly distributed on the evaporating surface by that spiral. As a result of the spiral construction of the distributing means and, in particular, because the pitch of the spiral, a further component of distribution is obtained not possible or possessed by any of the heretofore-known distributing devices, which additionally conveys the liquid down the evaporating surface. This effect is of particular importance as thereby, in accordance with the invention, a shorter time of stay of the liquid in the evaporator is obtained than in any of the known thin-film evaporators equipped with distributing devices, wherein the downward progression of the liquid was due solely to gravitational forces.

In accordance with the invention it is furthermore possible to adapt the construction so that all parts of the apparatus which come into contact with the liquid are constructed of glass. In this regard, the outside diameter of the cylinder, as well as the inside diameter of the glass spiral, is correlated for producing the proper spaced-apart relationship between the surfaces of each by grinding.

The film of liquid undergoes progressive distillation as it progresses down the evaporating surface while being repeatedly redistributed and advanced by successive spiral segments. At the bottom of the evaporating surface, the residue drops into the evaporator bottom and flows from the evaporator through a residue take-up pipe. The distilled molecules are separately collected and taken off through a distillate take-off pipe for storage in a receiver.

The invention will now be described in greater detail with reference to the accompanying drawing, showing schematically a certain preferred embodiment.

Referring to the drawing, numeral 1 designates a glass cylinder casing concentrically positioned inside a cylinder jacket 2. The top portion of the jacket 2 is provided with a distill and delivery or inlet pipe 3, and the bottom portion with a residue take-off pipe 4, and a distillate take-off pipe 5 for the distillate which collects in groove or gutter 9.

In accordance with the invention, the spiral 6 is rotatably supported so as to, on rotation thereof, come in contact with the evaporating surface of the cylinder 1. The drive for the rotating spiral 6 in the embodiment shown comprises an electromagnetic rotating field designated 7, arranged outside of the cylinder jacket 2 and in operative connection with a magnetic core 8 attached to the spiral 6 and acting as a carrier or engager. The use of the drive means of this type which are known from, and conventionally utilized in connection with, rotating anode X-ray techniques avoids the need for a drive shaft to be connected to the inside of the evaporator and passing through the wall of the cylinder casing. This is of considerable significance in that the space established between the cylinder jacket 2 and the cylinder 1 must be maintained under high vacuum.

In operating the apparatus illustrated in the drawing, a stream of the liquid to be treated is admitted through inlet pipe 3 and permitted to flow down by gravity on the outer wall of the cylinder 1 while the latter is heated by a suitable electrical heating device (not shown) so that evaporation occurs on the surface of the cylinder 1. As the liquid flows downwardly, the spiral 6 is slowly rotated, and the spiral effects the formation of a thin, uniform film against the outer surface of the cylinder 1—i.e., a uniform distribution of the liquid to be treated as well as a progressive downward advancement thereof.

It is also possible, in accordance with the invention, to bring about rotation of the spiral 6 by drive means externally arranged and in operative connection with a shaft arranged so as to be vacuum-tight.

Furthermore, while in the embodiment shown the spiral rotates over the evaporating surface to distribute and continuously redistribute the distillate uniformly over the entire evaporating surface in a thin film, it is entirely within the scope of the invention to construct the spiral to be stationary and to achieve the relative motion required between the spiral and the evaporating surface by rotating the evaporating surface.

As exemplified in the drawing, heating of the cylindrical evaporating surface 1 may be, for instance, accomplished by using a substantially hollow cylinder provided with the ceramic body 10 carrying electric resistance heating coils 13 suitably connected by way of current leads 14 and 14a to a source of electric power. A suitable heating medium, and preferably a heating coil as is conventionally known, is used within a hollow cylinder and, if necessary, the same may be maintained at a given temperature by suitable and conventional thermostatic control means (not shown). There is extending preferably into the upper portion of the hollow cylinder a rotatably mounted stirrer 11. The vacuum within the jacket 2 is preferably maintained by way of the relatively wide tubular member 12, which is connected to conventional vacuum pump means of, for instance, the well-known oil diffusion type (not shown) and capable of delivering a suction velocity of about 100 liters per second. In operation of the device, the vacuum pump means should produce a vacuum within the jacket of below about 1 micron. The tubular member 12 is positioned to slightly decline downwardly toward the evaporation device so as to prevent condensate descending on the inner jacket walls 2 from flowing off through the conduit 12.

The feed conduit 3 is so positioned that material is fed onto the cylindrical evaporating surface to be picked up by the rotating spiral and distributed as a thin film. The rate of feed is so adjusted that the same does not substantially exceed the capacity of the spiral to continuously distribute the fed material in the form of the desired thin film. This may necessitate feeding material to be distilled dropwise onto the cylinder surface.

Though suitable and conventional cooling means may be provided for the outer jacket tube, this is usually not necessary as condensation of the volatilized material will ordinarily take place at the inner surface of the jacket tube, normal room temperature of about 20° C. being sufficient for cooling purposes.

In accordance with the invention, a relatively close fit of spiral 6 with respect to the outer surface of cylinder 1 is required. The relative dimensions of such a fit, i.e., of the narrowness of spacing between the evaporating surface and the spiral 6, is best exemplified by the preferred embodiment of the invention in which both the cylinder surface and the thereto adjacent or opposed spiral surface are constituted of a material such as glass, quartz, and the like, capable of giving a ground fit, i.e., a fit as is conventionally known—for instance, for glass surfaces intended to be fitted or mated to one another. The fit between the spiral 6 and the outer surface of cylinder 1 should be such, however, that the spiral 6 is rotatable around the cylinder 1, which, in a given case, may be aided by a certain lubricating effect of the film of descending material.

Spiral 6 should have an upwardly inclining pitch with respect to its direction of rotation. Rotation of the spiral will then cause the upwardly inclined pitch not only to maintain the desired thinness of the film of material to be evaporated but will also give such film an upward thrust. The pitch and speed of rotation of the spiral should be so coordinated with the gravitational flow of the descending film of material that a downwardly directed component prevails. For most purposes, however, and within the preferred embodiment of the invention, a pitch of the spiral 6 of about 45° gives good results and is applicable to a wide range of materials and rotational speeds.

The distilled material collecting in an annular channel or trough 9 passes out through conduit 5 while the non-distilled residual material drops downwardly from the lower cylindrical portion and passes out of conduit 4. In each case, the materials from conduits 4 and 5 are preferably collected in suitable vessels which are, in conventional manner, hermetically sealed to their respective conduits (not shown). The material which is fed to the cylindrical surface by way of conduit 3 passes therethrough from a suitable storage tank (not shown), the sealing of which against the vacuum in the device is constituted, as well known, by the liquid itself. If desired, a suitable feed regulating valve (not shown) may be provided for the conduit 3.

In the practical operation of the device in accordance with the invention, the material desired to be distilled is slowly, such as dropwise, fed onto the upper evaporating surface of the cylinder 1, where it is distributed to form a thin film on the vaporizing surface by the action of the upper spiral portion 6, as the same is rotated in the direction of the arrow. The thin film of material then progresses downwardly, being continuously replenished by the feeding of additional material. The spirals in each area of downward flow serve to prevent the material from forming thicker layers and then to substantially assure the same thinness of layer in the downward movement of the film, at the same time permitting compensation for material which is vaporized.

The continuously downflowing thin film evaporates material until practically all of the vaporizable material has been distilled off, and it may be at times of advantage and constitutes an alternative embodiment of the invention to have the cylindrical vaporizing surface of downwardly gradually increasing temperature.

When using for the opposing surface of the spiral and the cylinder a material capable of giving a fit substantially equivalent to that of a ground glass fit and establishing such a fit by suitable grinding, and particularly when such cylinder and spiral are substantially composed of glass, quartz or the like material with a ground fit therebetween, the film formation and continuance thereof is additionally aided by the capillary action possessed by thusly ground surfaces.

While the apparatus has been described in considerable detail with reference to certain specific embodiments and adaptations, it should be understood that the invention is not limited thereto and that variations and modifications therein may be made without departing from the spirit and scope of the invention as defined in the appended claims.

As will be seen from the foregoing, the invention not only comprises a novel device for film-type distillation but also essentially defines a novel method for carrying out such distillation and which comprises the steps of continuously introducing a liquid mixture to be treated into a vacuum zone by applying such a liquid mixture as a continuous layer onto the upper portion of a cylindrical substantially vertical thermally-conductive heated surface, causing the layer of liquid material to continuously flow by gravitational force in a downward path over the heated surface in the form of a vertical cylindrical layer, simultaneously continuously subjecting the liquid mixture to movement over the heated surface in a direction opposed to that produced by gravitational force by passing the liquid layer into a zone established between the heated cylindrical surface and an opposed closely spaced-apart spiral surface, and rotating one of the two surfaces with respect to the other while regulating the movement of the liquid mixture so that the same is mechanically distributed and re-distributed onto the heated surface while being maintained in the form of a thin film layer and while being positively moved in a downward direction in this form.

With an advantageous form of execution the jacket has a height of 40 cm. and a wall thickness of 0.2 cm. The inside diameter amounts to 8 cm. The stationary cylinder which laps into the jacket has an outside diameter of 4 cm. The rod the spiral is formed of has a diameter of 0.6 cm. The spiral has been wound around the cylinder with a pitch of 30°. A constant touch of the spiral on all its parts with the cylinder is secured by loops. The distance of the outside wall of the cylinder from the inside wall of the jacket amounts to 2 cm. The jacket, the cylinder, the spiral, and the inlet and outlet tubes are made of glass. Heating is effected by means of fuel oil, or lubricating oil with a viscosity not exceeding 9000 cst./20° C., to be filled in the cylinder. An inserted stirrer made of glass serves for the distribution of the oil, whereas heating up is effected by means of an electric heat element which has also been inserted. Through the electrical heating the temperature of the fuel oil may easily be controlled. The fuel oil temperature can be measured by a thermoelement. This temperature depends on the substance to be distilled.

In order to obtain the vacuum, it is convenient to use oil diffusion pumps with a rate of evacuation of 100 l./sec. The required vacuum is inferior to one micron. In most cases a cooling of the external jacket is not necessary.

The rotation speed of the spiral is adjustable. Even with viscous substances it should not be higher than 5 rotations/sec. Care should be taken that in case of high speed no liquids are centrifuged by centrifugal forces.

The apparatus according to the invention ensures a careful distillation of thermally sensitive substances which have a especially high molecularity, as well as the distillation of chemically aggressive substances in the vacuum and high vacuum. It is suitable for film-type vaporization, short-way vaporization and for the molecular distillation. It may be used e.g. for the following purposes:

Production of vitamin extracts,
Distillation of high-molecular hydrocarbon,
Separation of fatty acids from oils and greases,
Distillation of waxes,
Purification of softeners,
Analytical purposes (clarification of structural problems),
Vaporization of solvents.

The apparatus is suitable for the distillation of substances sensitive to heat with a low vapor pressure in the pressure range inferior to 1 micron, as well as for film-type vaporization of substances of higher vapor pressure in a higher pressure range.

When operating the apparatus, the substances to be vaporized is filled into a container which is placed above the feeding pipe. Then the forepumps and the heating are switched on.

The required vacuum and the distillation temperature once having been obtained, the operating motor for the spiral is switched on, and the substance to be vaporized is led to the apparatus by interposing a regulating valve.

An air lock is connected in series before the receiving flasks for distillate and residue, so that it is possible to empty it without interrupting the distillation.

In many cases it is recommendable to install a predegasifyer between the container for liquids and the distillation apparatus. In this predegasifyer the liquid can be heated up by electrical heating of oil as a heat carrier. The dissolved gases and the highly volatile components are sucked off by means of a vacuum pump.

I claim:
1. A film distillation apparatus comprising:
 (a) An evacuable vessel;
 (b) A vertically disposed cylindrical evaporating surface made of ground glass arranged within said vessel in spaced-apart relationship therewith;
 (c) A rotatable spiral film distributing member made of ground glass arranged in circumferential spaced-apart relation between the interior surface of said vessel and said cylindrical evaporating surface, said spiral member being mounted for rotational wiping contact around said evaporating surface;
 (d) Means for introducing a liquid to be distilled onto the upper portion of said evaporating surface whereby vaporization of said liquid takes place on said evaporation surface to thereby form a distillate and residue;
 (e) Means for removing distillate from said vessel;
 (f) Means for removing residue from said vessel;
 (g) Means for evacuating said vessel;
 (h) A drive magnet disposed within said vessel and operatively connected to said spiral member for rotation therewith; and
 (i) Means disposed outside of said vessel for producing a magnetic field which cooperates with said drive magnet for rotating the spiral member whereby the liquid to be distilled is distributed in a thin film on the evaporating surface by said spiral, and evaporates therefrom to be condensed on the interior wall of the vessel as distillate.

2. A film distillation apparatus comprising:
 (a) An evacuable vessel;
 (b) A vertically disposed ground glass cylindrical evaporating surface arranged within said vessel in spaced-apart relationship therewith;

(c) A rotatable spiral film distributing member arranged in circumferential spaced-apart relation between the interior surface of said vessel and said cylindrical evaporating surface, said spiral member being mounted for rotational wiping contact around said evaporating surface, said spiral member also having a glass surface which is ground at least on the portion in wiping contact with said ground glass evaporating surface;

(d) Means for introducing a liquid to be distilled onto the upper portion of said evaporating surface whereby vaporization of said liquid takes place on said evaporation surface to thereby form a distillate and residue;

(e) Means for removing distillate from said vessel;
(f) Means for removing residue from said vessel;
(g) Means for evacuating said vessel; and
(h) Means for rotating said spiral member whereby the liquid to be distilled is distributed in a thin film on the ground glass evaporating surface by said spiral, and evaporates therefrom to be condensed as distillate on the interior wall of the vessel.

3. The apparatus of claim 1 wherein a clearance spacing is provided between the cylindrical evaporating surface and the spiral member.

4. The apparatus of claim 1 wherein the spiral member has an upward pitch of approximately 30 to 45° with respect to the direction of its rotation.

References Cited by the Examiner

UNITED STATES PATENTS

| | | | |
|---|---|---|---|
| 2,229,209 | 1/1941 | Houghton | 208—360 |
| 2,370,462 | 2/1945 | Hecker | 202—64 |
| 2,530,376 | 11/1950 | Castle et al. | 202—187 |
| 2,975,108 | 3/1961 | Watt | 202—64 |
| 3,054,444 | 9/1962 | Robbins | 202—64 |
| 3,060,107 | 10/1962 | Smith | 202—64 |

FOREIGN PATENTS

| | | |
|---|---|---|
| 923,042 | 6/1947 | France. |
| 978,997 | 4/1951 | France. |
| 1,216,602 | 11/1959 | France. |

NORMAN YUDKOFF, *Primary Examiner.*

GEORGE D. MITCHERR, *Examiner.*

W. L. BASCOMB, M. H. SILVERSTEIN,
*Assistant Examiners.*